United States Patent [19]

Katayama et al.

[11] 4,071,445
[45] Jan. 31, 1978

[54] METHOD AND APPARATUS FOR TREATING WASTE WATER ON SHIPS

[75] Inventors: Sakae Katayama, Kobe; Sadaoki Kanada, Ibaragi; Michitake Kamata, Takatsuki; Yasuhiro Sakaguchi, Yokohama; Katsumi Kojima, Saitama, all of Japan

[73] Assignees: Daicel, Ltd., Sakai; Katayama Chemical Works Co., Ltd., Osaka, both of Japan

[21] Appl. No.: 668,904

[22] Filed: Mar. 22, 1976

[30] Foreign Application Priority Data

Apr. 12, 1975 Japan ................................. 50-44577

[51] Int. Cl.$^2$ ............................................ B01D 13/00
[52] U.S. Cl. ................... 210/23 H; 210/44; 210/151; 210/152; 210/207; 210/259; 210/355; 210/433 M
[58] Field of Search ............... 210/23 H, 150, 151, 210/257 M, 259, 321 R, 433 M; 261/122, 123

[56] References Cited

U.S. PATENT DOCUMENTS

| | | | |
|---|---|---|---|
| 3,839,206 | 10/1974 | Welch | 210/259 |
| 3,939,070 | 2/1976 | Roth | 210/259 X |
| 3,970,731 | 7/1976 | Oksman | 261/122 |

OTHER PUBLICATIONS

Gouveia et al., "Potable Water from Hospital Wastes by Reverse Osmosis," from Chemical Engineering Progress, vol. 64, No. 90, 1968, pp. 280-284.

*Primary Examiner*—John Adee
*Assistant Examiner*—E. Rollins Cross
*Attorney, Agent, or Firm*—Hubbell, Cohen, Stiefel & Gross

[57] ABSTRACT

The present invention relates to a method and apparatus for treating waste water on ships, and more particularly to a method and apparatus for treating waste water on ships in a closed system.

11 Claims, 3 Drawing Figures

METHOD AND APPARATUS FOR TREATING WASTE WATER ON SHIPS

BACKGROUND OF THE INVENTION

Presently the disposal of industrial effluents and various other wastes causes environmental pollution, posing serious social problems and giving rise to the growing necessity of recycling these wastes using closed systems. Legislative efforts have resulted in to pollution control laws, while the (United Nations) Inter-Governmental Maritime Consultative Organization (IMCO) proposed International Convention for the Prevention of Pollution from Ships, 1973 including regulations for the disposal of sewage from ships. According to the Notification (No. 233) of the Japanese Ministry of Transportation, effluents from waste treating systems for ships must meet the following standards.
 i. Biochemical oxygen demand (BOD):Below 50 ppm.
 ii. Suspended solids (SS):Below 150 ppm.
 iii. Number of coliform bacteria:Below 3,000/ml
 iv. Solids over about 20 mm in size: None Until now, the most preferred method of waste treatment for ships is the activated sludge process which employs a fixed bed aeration tank. This method, however, generally reduces BOD to 60 to 100 ppm and SS to 100 to 150 ppm, at best and requires a flotation system in which an inorganic or organic coagulant is used, if it is desired to meet the above standards. Moreover, the method, rather than removing coliform bacteria permits the multiplication of the bacteria. The method has another serious drawback for marine services in that the apparatus used is heavy and requires a large space.

SUMMARY OF THE INVENTION

This invention relates to a method of treating waste water on a ship comprising the steps of passing the waste water through a coarse mesh filter and/or crushing means, subsequently separating the waste water by flotation under aerated condition to reduce suspended solids in the waste water to below 1,000 ppm, and clarifying the resulting treated water by passing the water through a semipermeable membrane. Also disclosed is an apparatus for ships which can be used for practicing the method as mentioned above, which comprises (i) means for feeding waste water on a ship, (ii) a coarse filter and/or crushing means for removing relatively large solids from the waste water, (iii) at least one liquid-solid separation column of the flotation type having a plurality of downwardly slanting bubble generating plates projecting alternately from opposed inner walls of the column, with a small space formed between the free end of each of the plates and the inner wall opposed thereto, each of the bubble generating plates including an open-cellular plate-like member and a pressurized gas distributing channel formed within the plate-like member and extending substantially in parallel to the plane of the member, the liquid-solid separation column having a waste water inlet at its bottom portion and an outlet at its upper portion, (iv) means for supplying a pressurized gas to the distributing channel, and (v) a treating system incorporating a semipermeable membrane and a high-pressure pump.

The primary object of the invention is to provide a novel method and apparatus for treating waste water for use on ships employing a closed system and adapted to meet the foregoing maritime standards.

Another object of the invention is to provide a method and apparatus for treating waste water adapted for safety and long-term operation on ships.

Still another object of the invention is to provide a method for treating waste water on ships and an apparatus therefor which is compact, relatively lightweight and which is accordingly installable on small ships.

In order to attain the above objects, the apparatus of the invention is characterized by a novel liquid-solid separation column in combination with a treating system equipped with a semipermeable membrane and a high-pressure pump and also by the unique combination of various means for assuring the proper and safe operation of the combined unit.

The term "waste water" as used herein includes sewage, which means:
 a. drainage and other wastes from any form of toilets, urinals, and WC scuppers;
 b. drainage from medical premises (dispensary, sick bay, etc.) via wash basins, wash tubs and scuppers located in such premises;
 c. drainage from spaces containing living animals; or
 d. other waste waters when mixed with the drainages defined above.

Wash water used for this invention may suitably be fresh water or seawater. Generally, the mixture of human excretion and wash water has a BOD value of about 100 to about 1,000 ppm and contains about 200 to about 1,500 ppm of suspended solids and about $10^6$/ml or more of coliform bacteria.

According to the invention, the waste water to be treated is first passed through a coarse mesh filter and/or crushing means to treat relatively large solids which are inadvertently disposed of in the waste water. This step can be omitted where good care is taken of waste disposal. However, since objectionable solids may possibly interfere with the operation of the apparatus, it is preferable to practice this step in view of safety operation and the trouble required for the removal of such solids.

Subsequently, the waste water is subjected to separation by flotation under aerated conditions to reduce suspended solids therein to below 1,000 ppm, preferably below 500 ppm, and most preferably below 100 ppm.

The clarification of waste water contemplated by this invention is to remove impurities therefrom in conformity with the standards of BOD of below 50 ppm, SS of below 150 ppm and coliform bacteria of less than 3,000/ml. More preferably it is desired to remove coliform bacteria almost completely and to greatly reduce SS and BOD to about 2 and about 30 ppm respectively.

The coarse mesh filter used in this invention for the removal of large solids which may be contained in the waste water is a conventional filter having meshes, for example, of about 3 cm × 3 cm. A preferred example of the crushing means is a crusher pump having an obliquely toothed rotor and a toothed casing. The crusher pump also serves to feed waste water to the treating apparatus. The coarse mesh filter and crushing means may preferably be disposed in combination to remove solids which are too large to crush by the crushing means.

A liquid-solid separation column of the flotation type is employed in this invention as an advantageous means for reducing suspended solids to below 1,000 ppm. By the liquid-solid separation column is meant a column into which air bubbles are forced to separate solids by flotation. Preferably, the column may be provided with an auxiliary column, but this arrangement is not essential. A plurality of such flotation-type liquid-solid separation columns may be employed arranged either in parallel or in series. When they are arranged in series, the auxiliary column may be dispensed with.

The semipermeable membranes used in this invention are ultrafilters and reverse-osmosis membranes through which waste water can be passed in the form of clarified water under high pressure, for example, of 3 to 10 kg/cm$^2$ and 3 to 100 kg/cm$^2$ respectively. Examples of semipermeable membranes are cellulose acetate membrane, cellulose acetate butyrate membrane, acrylonitrile copolymer membrane, polyamide membrane, etc., among which the cellulose acetate butyrate membrane having micropores of about 6 to about 60 A is preferred. These semipermeable membranes ensure highly efficient treatment for the removal of various organic and inorganic substances and coliform bacteria from water as well as for the desalination of seawater. Reverse-osmosis membranes, in particular, permit almost complete removal of coliform bacteria and various other bacteria and viruses, giving potable water. Thus, they function ideally for closed systems. The reverse-osmosis membrane and ultrafilter may be used selectively, depending on the desired concentration of impurities. Preferably, the waste water to be treated by the membrane is substantially neutral. Where necessary, therefore, a pH adjusting agent may be used. The circulating water to be brought into contact with the semipermeable membrane may have a flow rate of at least about 0.5 m/sec., preferably at least 1.0 m/sec.

The term "open-cellular plate-like member" as used herein refers to a hard or soft porous plate which is gas- and liquid-permeable but which is almost impermeable to solids. The term "open-cellular" is used as opposed to "closed-cellular." Generally known as a preferred example is a porous material prepared by sintering beads of SAN resin (styrene-acrylonitrile copolymer) or ABS resin (styrene-acrylonitrile-butadiene copolymer). By passing through the open-cellular plate-like member, gas is divided into numerous fine bubbles of uniform size. The plate-like member, which passes liquid, also functions to separate solids therefrom. Of course, these functions relate to the size of the open cells. The above-mentioned porous material obtained by sintering beads of SAN resin or ABS resin may preferably have open pore diameters of about 10 to about 1,000 $\mu$ for the treatment of the usual industrial effluent and waste water. The desirable thickness of the plate is about 10 to about 100 mm.

The term "pressurized gas distributing channel" used herein refers to a simple tunnel-like channel (bore) or a channel provided by a synthetic or metal pipe embedded in the porous plate-like member, the channel being suited for the distribution of pressurized gas. The portions of the channel are formed within the open-cellular plate-like member in branched or zigzag arrangement in parallel to the plane of the member. The pressurized gas supplied to the channel is discharged from the surface of the member in the form of uniform fine bubbles with uniform density. The distributing channel should have the smallest thickness and length required so as not to interfere with the separation of solids and filtration of liquid to be performed by the open-cellular plate-like member.

This invention will be described below with reference to an embodiment of the invention illustrated in the drawings. The invention, however, is not limited to the illustrated embodiment.

DESCRIPTION OF THE PREFERRED EMBODIMENT

Figure 1:
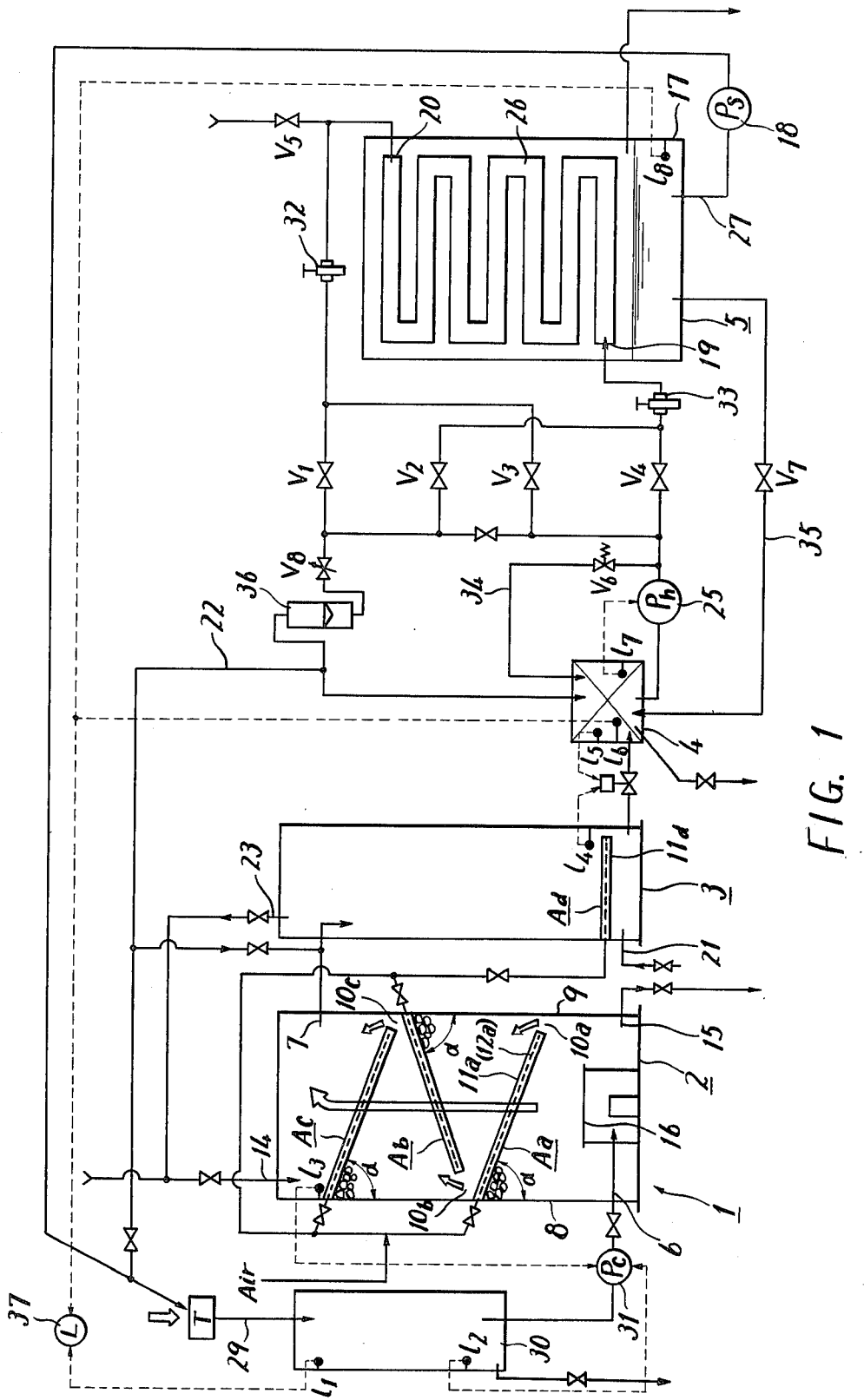
FIG. 1 is a diagram illustrating an embodiment of the apparatus of this invention for treating waste water for use on a ship.

FIG. 1 shows a compact apparatus 1 for treating waste water for use on ships comprising a liquid-solid separation column 2 of the flotation type, a circulating water tank 4, a high-pressure pump 25 and a reverse-osmosis tank 5 which are connected together in the order mentioned.

Figure 2:
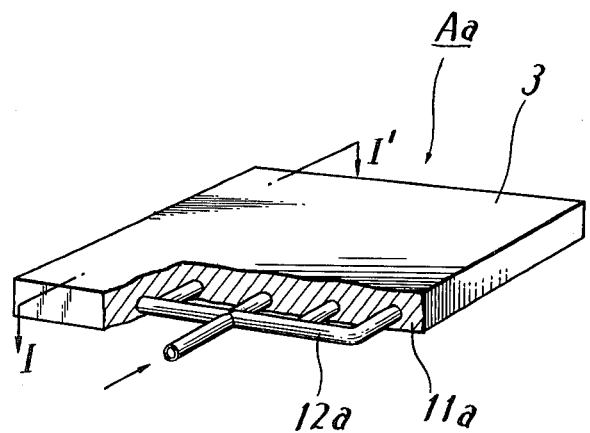
FIG. 2 is a perspective view showing a bubble generating plate used in the apparatus.
Figure 3:
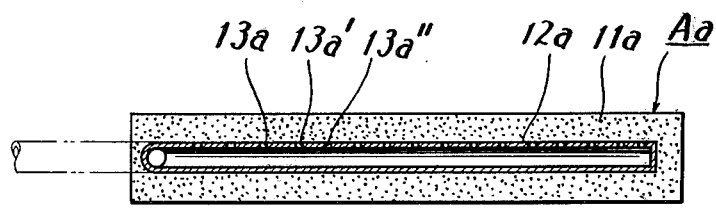
FIG. 3 is a view in section taken along the line I–I' in FIG. 2.

The liquid-solid separation column 2, substantially square in cross section, has a waste water inlet 6 at its bottom portion and an outlet 7 at its upper portion for feeding pretreated water to the auxiliary column 3. Downwardly slanting bubble generating plates A$a$, A$b$ and A$c$ project alternately from the opposed inner walls 8 and 9 of the column 2, each at an angle $\alpha$ (for example of about 65°) with the wall, as if partitioning the column 2 transversely thereof, with small spaces 10$a$, 10$b$, and 10$c$ formed between the free ends of the plates and the opposed inner walls 8 and 9. The bubble generating plate A$a$ is in the form of a single flat plate and comprises a hard open-cellular plate-like member 11$a$ made of synthetic resin and a branched synthetic resin pipe channel 12$a$ for distributing pressurized air embedded in the member in parallel to its plane as shown in FIGS. 2 and 3. The pipe channel is formed with a number of aligned small holes 13$a$, 13$a'$, 13$a''$ . . . in its top. The pressurized air distributing pipe channel 12$a$ is connected to a pressurized air source. The other bubble generating plates A$b$ and A$c$ have the same construction as the plate A$a$. The liquid-solid separation column 2 of FIG. 1 is further provided with an inlet 14 for admitting backwashing water such as seawater immediately above the upper top portion of the bubble generating plate A$c$ and with an outlet 15 at one side of its bottom portion opposite the waste water inlet 6. The column 2 includes a baffle plate 16 for reducing the force of inflowing waste water. Disposed upstream from the waste water inlet 6 are a feed channel 29, a temporary retaining tank 30 for controlling the load on the separation column 2 and a crusher pump 31 equipped with an unillustrated coarse mesh filter.

The auxiliary column 3 of the flotation type includes, in the vicinity of its bottom, a horizontal bubble generating plate A$d$ having the same construction as the bubble generating plate A$a$.

The reverse-osmosis tank 5 which is a terminal waste water treating tank comprises an outer container 17 and a tubular channel 26 in the form of a one series pass extending in zigzag fashion within the container and formed by a tubular semipermeable membrane for reverse osmosis such as cellulose acetate butyrate membrane and a rigid perforated tube covering the membrane. The tubular channel 26 may comprise a plurality of parallel passes. By way of the circulating water tank 4 and high-pressure pump 25, the front end 19 of the tubular channel is connected to the auxiliary column 3.

The rear end 20 of the tubular channel is connected to the circulating water tank 4. By means of a pump 18, clarified water is discharged from the container 17 through outlet 27 and recycled to a specified location. A duct 22 is provided to introduce the circulating water within the reverse osmosis tank 5 into the separation column 2 or the auxiliary column 3. A pair of mesh screen holders 32 and 33 provided at the opposite ends of the channel 26 respectively retain a movable sponge ball (not shown) between the mesh screens for cleaning the channel 26. During operation, the sponge ball is positioned at the location of the holder 32. The apparatus further includes change-over valves $V_1$ to $V_4$. The channel 26 can be cleaned automatically by employing timers and electromagnetic valves for $V_1$ to $V_4$. Indicated at $V_5$ is an air release valve, at $V_6$ a safety valve, at 34 a release line therefor in communication with the circulating water tank 4, at 35 a line interconnecting the container 17 and the tank 4 and provided with a valve $V_7$, at $V_8$ a valve for controlling the internal pressure of the channel 26 to a specified level, at 36 a flow indicator, at $l_1$ to $l_8$ level sensors, and at 37 an alarm lamp. The dotted lines and arrows shown indicate the direction of delivery of signals. The auxiliary column 3 has an inlet 21 and an outlet 23 for backwashing water. The outlet 23 is in communication with the backwashing water inlet 14 of the column 2.

Waste water is treated by the method described below using the apparatus 1. When the liquid level within the liquid-solid separation column 2 of the flotation type drops, the level sensor $l_3$ operates, actuating the crusher pump 31 into operation for a period of time, whereby the waste water within the retaining tank 30 is subjected to filtration by the coarse mesh filter and to crushing action and is then introduced into the column 2 through the inlet 6. The crusher pump 31 crushes relatively large solids, thereby permitting the bubble generating plates A$a$, A$b$ and A$c$ to function effectively for a prolonged period of time. The crusher pump also makes it possible to render the separation column 2 compact. The waste water is attenuated and crushed by the baffle plate 16 and then reaches the bubble generating plate A$a$ while gradually rising. The solids in the water are held beneath the plate A$a$, while the pretreated water ascends through the open-cellular plate-like member 11$a$ of the bubble generating plate A$a$. Part of the pretreated water flows upwardly through the space 10$a$. Consequently, the pretreated ascending water becomes mixed with fine bubbles of uniform size and density forced out upwardly from the upper surface of the plate A$a$. This promotes liquid-solid separation by flotation and at the same time further divides the solids. The separated solids are accumulated beneath the slanting bottom surface of the bubble generating plate A$b$. The ascending fine bubbles from the plate A$a$ act to hold the accumulated solids in position. Through the treatment thus effected in succession and continuously, solids are efficiently accumulated within the liquid-solid separation column 2. Therefore a predominant quantity of solid pollutants in the pretreated water are accumulated in a concentrated form. The concentration achieved is as high as about 60 times the original concentration. The efficient concentration of waste water therefore renders the apparatus compact and lightweight, reducing the load on the ship.

The water treated as above is then sent out from the outlet 7 into the subsequent auxiliary column 3, in which it is again mixed with fine bubbles generated from the open-cellular plate-like member 11$d$ incorporated in the bubble generating plate A$d$, with the result that the remaining solids are separated and accumulated in the upper portion of the column. The suspended solids in the resulting water are thus reduced to below about 100 ppm.

By way of the circulating water tank 4 and high-pressure pump 25, the treated water is fed for circulation to the tubular channel 26 within the reverse-osmosis tank 5 which channel is formed by a tubular semipermeable membrane, at a flow rate of about 1 m/sec. under high pressure. The clarified treated water permeating through the membrane into the container, which is usable even as drinking water when deodorized, is then run off from the outlet 27 and conducted to a suitable location for reuse. Because the semipermeable membrane of the reverse-osmosis tank 5 is useful for the desalination of seawater, there is no need to load the ship with fresh water other than the portable water needed for navigation. The apparatus therefore contributes a great deal to the mitigation of the load on the ship. The concentrated circulating water is returned to the liquid-solid separation column 2 or auxiliary column 3. In the event that the semipermeable membrane defining the channel 26 in the reverse-osmosis tank 5 is clogged, the change-over valves $V_1$, $V_4$ are closed and the change-over valves $V_2$, $V_3$ are opened to reverse the flow of circulating water through the channel 26, causing the movable cleaning sponge ball (not shown) to slidingly move through the channel 26 from the location of the mesh screen holder 32 to like holder 33 for cleaning.

Using seawater or like backwashing water admitted through the inlet 21, the solid wastes concentrated and accumulated within the separation column 2 and auxiliary column 3 are dumped from the outlet 15 into the ocean outside the area prohibited by the IMCO convention. Usually the backwashing may be conducted approximately once every month during operation.

Given below are the specifications for a specific embodiment of the compact waste water treating apparatus described above.

Retaining tank 30:1,000 mm in height, 0.2 m$^2$ in cross sectional area.
Separation column 2:1,000 mm in height, 0.16 m$^2$ in cross sectional area.
Auxiliary column 3:1,000 mm in height, 0.1 m$^2$ in cross sectional area.
Circulating water tank 4:1,000 mm in height, 0.36 m$^2$ in cross sectional area.
Reverse-osmosis tank 5: Tubular cellulose acetate butyrate membrane, $\frac{1}{4}$ inch in diameter, 3.5 m$^2$ in area.
Crusher pump 31:6,000 l/h. Solids (e.g. 20 cm × 10 cm cloth) crushable to about 0.5-cm square.
Pump 18:$\frac{1}{2}$-inch cascade pump, 1,800 l/h.
High-pressure pump 25:50 kg/cm$^2$, 600 l/h.

The apparatus of the above specifications is loadable in a tanker or cargo ship with a crew of 20 to 30 men or in a ferry or passenger boat with a similar passenger capacity, which may operate for about 20 days without disposing of accumulated solids in the separation column. The treating capacity is about 40 l/h, and the treated clarified water drawn off from the reverse-osmosis tank 5 becomes potable when deodorized and of course conforms to the standards of BOD of below 50 ppm, SS of below 150 ppm and coliform bacteria of below 3,000/ml.

This invention with be further described below with reference to experiments conducted with the use of artificial waste water and human excretions mixed with wash water.

EXPERIMENT 1

Artifical waste water was prepared in the usual manner from peptone, meat extract, sodium chloride, disodium hydrogen phosphate, calcium chloride, magnesium sulfate, potassium chloride, urea and tap water. The waste water prepared was the standard waste water specified by Shipping Bureau, Ministry of Transport, Japanese Government. A 100 g quantity (dry weight) of crushed pulp was added to 200 l of the artificial waste water. Thus the water contained 500 ppm of SS. The waste water was then passed through the liquid-solid separation column 2 and auxiliary column 3. The waste water obtained contained about 10 ppm of SS.

The resulting waste water was then circulated in the reverse-osmosis tank 5 for further treatment under pressure of 30 kg/cm² at a flow rate of 1 m/sec. The waste water was treated at a rate of 40 l/h. The original artificial waste water had BOD of 850 ppm which is more than 3 times the BOD of untreated sewage which is said to be about 250 ppm. (See Table 2 for other properties of the waste water.) The results of the experiment are given in Tables 1 and 2.

Table 1
Properties of Water Clarified by Reverse-Osmosis

| Properties | Amount of clarified water (l) (Treating time) | | | | |
|---|---|---|---|---|---|
| | About 4 (5 min.) | 50 | 100 (2.5h) | 150 | 180 (4.5 h) |
| pH | 6.82 | 7.00 | 6.91 | 7.00 | 6.98 |
| Electric conductivity (μΩ/cm) | 18.60 | 20.75 | 29.95 | 60.55 | 247.0 |
| BOD (ppm) | 5 | 5.5 | 6.0 | 7.0 | 14.0 |
| Cl (ppm) | 1 | 1 | 1 | 3.2 | 62.0 |

Table 2
Properties of Circulating Water in Reverse-Osmosis Tank

| Properties | Amount of circulating water (l) | | | | |
|---|---|---|---|---|---|
| | 200 | 150 | 100 | 50 | 20 |
| pH | 7.10 | 7.09 | 7.05 | 7.08 | 7.04 |
| Electric conductivity (μΩ/cm) | 1700 | 2040 | 2660 | 4810 | 12950 |
| BOD (ppm) | 850 | 1010 | 2000 | 3600 | 14000 |
| Cl (ppm) | 706 | 896 | 1546 | 2572 | 7500 |

The tables indicate that the circulation through the reverse-osmosis tank increases the BOD of the circulating water to 14,000 ppm at the end of the experiment (namely the BOD of the artificial waste water to be treated in the reverse-osmosis tank is about 60 times that of untreated sewage), whereas the clarified water has entirely satisfactory values. The remaining water with the components concentrated by the reverse-osmosis tank has a volume about 1/10 the original volume of the waste water. The residual water may be returned to the liquid-solid separation column or the like or transferred to a storage tank, in which it may be held temporarily for disposal.

EXPERIMENT 2

An apparatus having the same construction as the foregoing embodiment of the waste water treating apparatus for ships was installed in a toilet serving 40 employees in a factory, and a long-term experiment was conducted with the results given in Table 3 below.

Table 3

| Days elapsed | Water temp. (° C) | Treated water | | |
|---|---|---|---|---|
| | | BOD (ppm) | SS (ppm) | Coliform bacteria (in ml) |
| 1 | 25 | 1.5 | 0 | 0 |
| 2 | 27 | 2.5 | 0 | 0 |
| 3 | 25 | 3.5 | 0 | 0 |
| 4 | 24 | 4.0 | 0 | 0 |
| 5 | 26 | 5.0 | 0 | 0 |
| 6 | 24 | 5.5 | 0 | 0 |
| 7 | 25 | 5.5 | 0 | 0 |
| 8 | 25 | 6.0 | 0 | 0 |
| 9 | 26 | 7.0 | 0 | 0 |
| 10 | 25 | 8.5 | 0 | 0 |

The BOD increased day by day due to the concentration of the circulating water. On the 10th day, the circulating water had BOD of 11,500 ppm, SS of 6,500 ppm and coliform bacteria of more than $1 \times 10^7$/ml.

What is claimed is:

1. A method of treating waste water on a ship comprising the steps of passing waste water through a coarse mesh filter and a crushing means; causing the filtered waste water to flow upward; passing the waste water through a plurality of downwardly slanting open cellular plate-like members projecting alternately from a pair of opposed walls defining a passage for the upward flow of the waste water, with a small space provided between the free end of each of the plate-like members and the wall opposed thereto, while causing large suspended solids to be separated from the waste water and accumulated in a concentrated state beneath each of the plate-like members by flotation with bubbles generated in the interior of each of the plate-like members to thereby reduce suspended solids in the waste water to below 1,000 ppm and clarifying the resulting treated water by passing the treated water through a semipermeable membrane.

2. A method of treating waste water according to claim 1 wherein the semipermeable membrane is a reverse-osmosis membrane.

3. A method of treating waste water according to claim 1 wherein the semipermeable membrane is a reverse-osmosis membrane made of cellulose acetate butyrate and having micropores of from about 6 to about 60 A.

4. A method of treating waste water according to claim 1 wherein the waste water is separated by flotation under aerated conditions to reduce suspended solids in the waste water to below 100 ppm.

5. An apparatus for treating waste water on a ship comprising:
  i. means for feeding the waste water,
  ii. means for removing relatively large solids from the waste water,
  iii. at least one liquid-solid separation column of the flotation type having a plurality of downwardly slanting bubble generating plates projecting alternately from opposed inner walls of the column, with a small space formed between the free end of each of the plates and the inner wall opposed thereto, each of the bubble generating plates including an open-cellular plate-like member and a pressurized gas distributing channel formed within the plate-like member and extending substantially in parallel to the plane of the member, the liquid-solid separation column having a waste water inlet at its bottom portion and outlet at its upper portion, iv. means for supplying a pressurized gas to the distributing channel, and v. a treating system incorporating a semipermeable membrane and a high-pressure pump.

6. An apparatus for treating waste water according to claim 5 which includes one liquid-solid separation column of the flotation type provided with an auxiliary column of the flotation type disposed subsequent to the separation column and having a horizontal bubble generating plate of the same construction as the bubble generating plate at a bottom portion of the auxiliary column.

7. An apparatus for treating waste water according to claim 5 comprising 2 to 3 of said liquid-solid separation columns of the flotation type arranged in series.

8. An apparatus for treating waste water according to claim 5 wherein the means for feeding the waste water and the means for removing relatively large solids is a crusher pump.

9. An apparatus for treating waste water according to claim 5 wherein the treating system incorporating the semipermeable membrane and the high-pressure pump comprises a circulating water tank, the high-pressure pump and a tank containing the semipermeable membrane arranged in the order mentioned to provide a circulation channel.

10. An apparatus for treating waste water according to claim 5 wherein the semipermeable membrane of the treating system is tubular, and each pass constituting a tubular channel is internally provided in the vicinity of each of its opposite ends with at least one mesh screen, a movable cleaning sponge ball disposed between the mesh screens and a change-over valve for reversing the flow of circulating water through the tubular channel.

11. An apparatus for treating waste water according to claim 5 wherein means is provided for transferring the treated water passing through the semipermeable membrane to a location for reuse thereof.

* * * * *

UNITED STATES PATENT OFFICE
CERTIFICATE OF CORRECTION

Patent No. 4,071,445  Dated January 31, 1978

Inventor(s) SAKAE KATAYAMA et al

It is certified that error appears in the above-identified patent and that said Letters Patent are hereby corrected as shown below:

Column 1, line 10: "resulted in to" should read -- resulted in --; line 41: "condition" should read -- conditions --.

Column 2, line 51: "2" should read -- 2 ppm --.

Column 8, line 1 of claim 1: "on" should read -- for --; line 2 of claim 5: "on" should read -- for --.

Signed and Sealed this

Twentieth Day of February 1979

[SEAL]

Attest:

RUTH C. MASON
Attesting Officer

DONALD W. BANNER
Commissioner of Patents and Trademarks